Sept. 22, 1959 B. C. LOEW 2,905,188
CHECK VALVE
Original Filed April 11, 1952

INVENTOR.
BURL C. LOEW
BY

United States Patent Office
2,905,188
Patented Sept. 22, 1959

2,905,188

CHECK VALVE

Burl C. Loew, New Era, Mich., assignor, by mesne assignments, to ACF Industries, Incorporated, New York, N.Y., a corporation of New Jersey Original application April 11, 1952, Serial No. 281,803. Divided and this application November 16, 1956, Serial No. 627,720

4 Claims. (Cl. 137—543.15)

This application is a division of my application, Serial No. 281,803, filed April 11, 1952, now abandoned.

This invention relates to pump valves and pump valve parts for reciprocating pumps for liquids and gas which are designed for variable volume at constant pressures throughout a variable range of speeds. More particularly, the invention relates to the type of valve and valve parts suitable for fuel pumps, vacuum boosters, or the like, such as generally employed in automotive practice, and especially to the novel valve caging device used with such valves and the method of making this caging device.

Valves suitable for this purpose must meet many requirements, since they are directly driven from the vehicle engine. Therefore, such valves must be capable of full opening in response to gas pressure, so that the pump will be self-priming at low engine cranking speed.

These valves must also be capable of full capacity at operating frequencies at least as high as 2000 cycles per minute, which speed corresponds to engine operation in the 4000 r.p.m. range. Under such circumstances, the pump valves are opened and closed with such rapidity that, due to impact, excessive wear may take place on both the inlet valve and outlet valve parts and their respective seats unless adapted to the use by proper design.

From a production standpoint the valve assembly for this type of pump must be designed to contain as few parts as possible, and those must be simple to manufacture and readily adapted to production methods and techniques. Furthermore, the fabricated valve part, when produced, must be capable of ready assembly in a pump casing.

The object of this invention is a valve stop or caging member of novel design suitable for use in a valve assembly of a pump such as shown in the application above identified.

Other objects of the invention will become apparent as the description proceeds.

Referring to the accompanying drawings, which show the preferred embodiment and illustrate the method:

To facilitate a clear understanding of the invention, an automotive type of fuel pump has been shown which illustrates one of the uses to which this invention may be applied. This illustration is regarded as merely an environmental background from which other uses of the invention may become apparent to any person skilled in the art or science to which it appertains.

Figure 1:
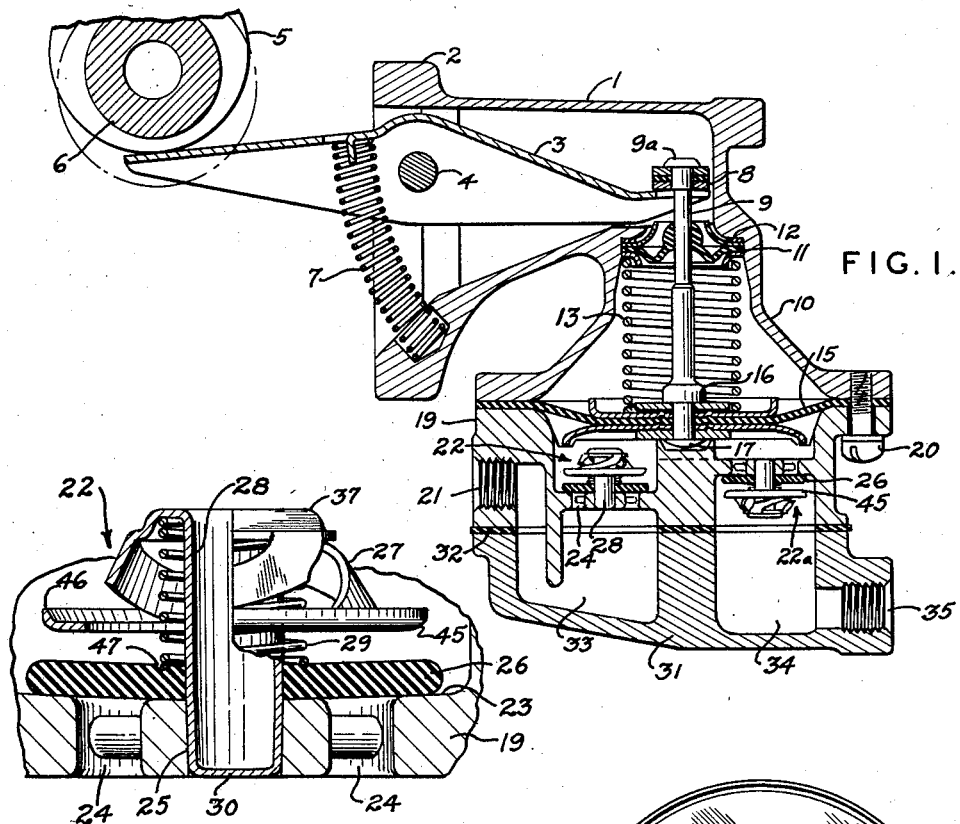
Fig. 1 is a sectional elevation of an automotive fuel pump embodying a novel valve caging or stop device.

By way of example, the drawings in Fig. 1 show a main pump casting 1 comprising a flange 2 for attachment to the engine block (not shown). The main casting provides a housing for the rocker arm actuating device for the pump indicated by reference 3, pivoted near the flange on a bearing 4, for rocking movement imparted by the cam 5 on the camshaft 6 of the engine in one direction, and in the opposite, under the pressure of spring 7, positioned between the casting of the pump body and the outward end of the rocker arm 3. The opposite end of the rocker arm engages under a stack of suitable washers indicated as 8 mounted on the stem 9 of the pump and held in engagement therewith by the headed end 9a thereof. The stem in turn extends downwardly through a bell-shaped portion of the pump casting indicated as 10. In this portion is an oil seal device indicated generally as 11 surrounding the stem 9 and pressed into engagement with the shoulder 12 of the bell-shaped portion of the pump body casting 10 by compression spring 13. The spring in turn engages at its opposite end on one of several superposed plain and cup-shaped washers at opposite faces of the pump diaphragm 15. These washers are in turn held in place on the pump stem 9 between a shoulder 16 and a headed end 17 on the pump stem.

The bell-shaped portion of the pump casting attaches to an intermediate valve chamber casting indicated as 19 by screws 20 which secure the parts together and at the same time seal the diaphragm edges to the body of the pump.

The valve chamber casting includes an intake port indicated at 21 and a passage therefrom to intake valve 22 and outlet valve 22a, each of which is mounted on bridge members spanning the passages and provided with valve seats 23 for each of the valves. The valve seats are provided with a fluid port comprising a ring of passages 24. Within the periphery and centrally located with respect to these ports 24, is a valve stem receiving socket 25. Although not clearly shown in this particular figure of the drawing, the surface of each bridge member of valve seat 23 is slightly dished. This feature is shown in greater detail by the enlarged views of Fig. 2, etc. The flow of fluid through the ring of ports 24 for each valve seat is controlled by check valve devices 22 and 22a which comprise in each case an identical structure. For this reason the description is applicable to either. Each check valve device comprises a flexible synthetic rubber or plastic disk 26. The check valve disk 26 is in turn held yieldingly in place by a caging device or mushroom-shaped valve guiding and stop member which will now be specifically described.

The valve caging device comprises a guide stem at 28 snugly fitting the central hole of the valve disk 26 and formed integrally with a mushroom-shaped head including an outer lower edge forming a ring-shaped valve stop member 45 with integral struts 27 for supporting the valve stop 45 on the stem. Interposed between the mushroom-shaped head and the ring-shaped check valve 26 is a spring 29 for yieldingly urging the check valve member into conformity with its seat 23. The caging device is secured to the valve seat by its stem member alone. This hollow stem member may be provided with a tapered lower end frictionally anchored in place in a tapered socket 25 of the valve seat bridge member. The press fit causes deformation of the closed end 30 of the stem 28 which tends to expand the stem sides and aid in anchoring the stem in the socket. The amount of deformation is exaggerated in this view solely for the purpose of illustration. Actually, in assembly of the stem with the seat, a flat anvil is placed on the opposite side of the seat and the stem is pressed into the socket until this convex and engages and is slightly deformed by the anvil, thus expanding the stem and fixing the parts in place.

Figure 2:
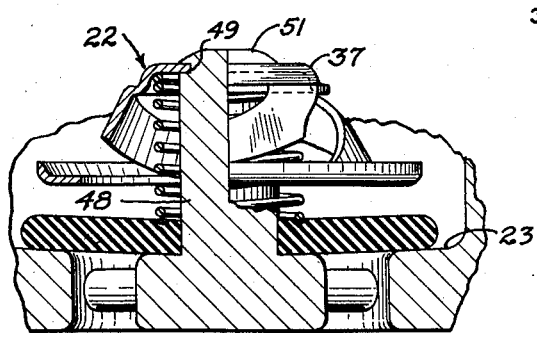
Fig. 2 is a view partly in section showing a pump valve.

As more clearly shown in Fig. 2, for example, the ring-shaped check valve 26 is pressed into seating engagement at its inner and outer peripheries by spring 29 engaging adjacent one periphery of the valve and between the valve and the caging device. This is due to the fact that the lower surface of the valve is planar, while the dished seat is generally concave. The resistance of the valve to deformation by the seat is an inherent characteristic of resilient material, and this resistance seats the outer periphery of the valve disk. It should be clearly understood, however, that this improved type of seat is not absolutely necessary, but that a planar seat may be used with either a valve having a planar lower seating surface or a concave lower seating surface.

In operation it can be readily understood that a check valve such as above described is capable at least of two separate and distinct actions, depending upon the volume of fluid entering through the ports 24 in the bridge valve seat portion of the casing. In cases where the volume is sufficiently large, the check valve member will accommodate and respond thereto by sliding upwardly on the stem member against the action of the spring until it strikes the stop of the caging device. This depending stop of the caging device limits the amount of travel of the ring-shaped check valve so that the return action of the valve will be prompt and, because of the small distance necessary to close, and because of the progressive manner of closing, will be without serious impact on the valve seat, which has in the past given so much difficulty in the mechanical operation of pumps of this type. On the other hand, when the volume passing the check valve is small due to the back pressure against the pump diaphragm, the valve itself is of such construction that the disk will flex slightly upwardly at its outer edges and by-pass the small volume of fluid without the extreme travel necessary under situations required during priming of the pump and when large volumes are necessary. The dished upper surface of the bridge valve seat member 23 permits this action of the ring-shaped check valve and effects distortion of the valve during seating, which cushions its seating action.

The valve design above described facilitates the assembly of the pumps by production methods. The step of installing a valve for the pump in assembly requires merely the placing of the ring-shaped check valve disk on the stem, or in place on the bridge member, and then forcible insertion of the stem of the mushroom-shaped caging device with its spring assembled into the socket 25 of the bridge member. Anchoring of the same in the bridge member will be automatic, due to the press fit.

Since the inlet valve 22 and outlet valve 22a are identical, the same reference characters have been applied to both.

The valve chamber casting is capped by an outlet casting 31 sealed to the valve chamber casting by a gasket 32 and attached in place by means not shown. This casting member includes a portion of the inlet passage 33 and outlet passage 34 with its corresponding outlet connection 35.

Fig. 2 shows the valve assembly of Fig. 1 enlarged for purpose of better illustration. As described above, the bridge valve seat member 23 is dished or concave as above described and receives thereon the rubber or plastic ring-shaped check valve 26 overlapping and controlling ports 24 which are fluid passages in the bridge valve seat member. The disk valve is held in place by a mushroom-shaped valve guiding and stop member 22 having a hollow stem 28 closed at one end as at 30. The stem is pressed into the socket 25 at one end, and is formed at its opposite end with a rolled portion 37 or head from which integrally formed spiral struts extend in supporting relation to ring-shaped valve stop member 45 provided with an upwardly turned outer edge 46. A spring 29 is interposed between the stop head 37 and the valve disk 26 seating in a groove 47 therein provided for this purpose.

Figure 4:
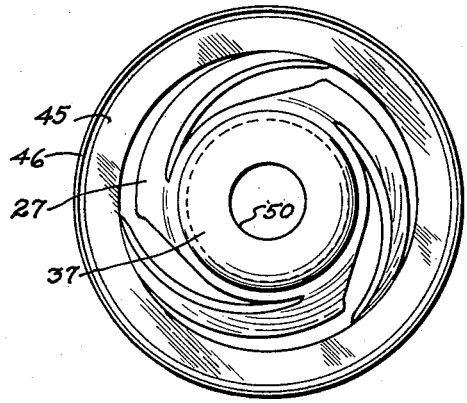
Fig. 4 is a top plan view of the stop or caging element shown in Fig. 3.
Figure 3:
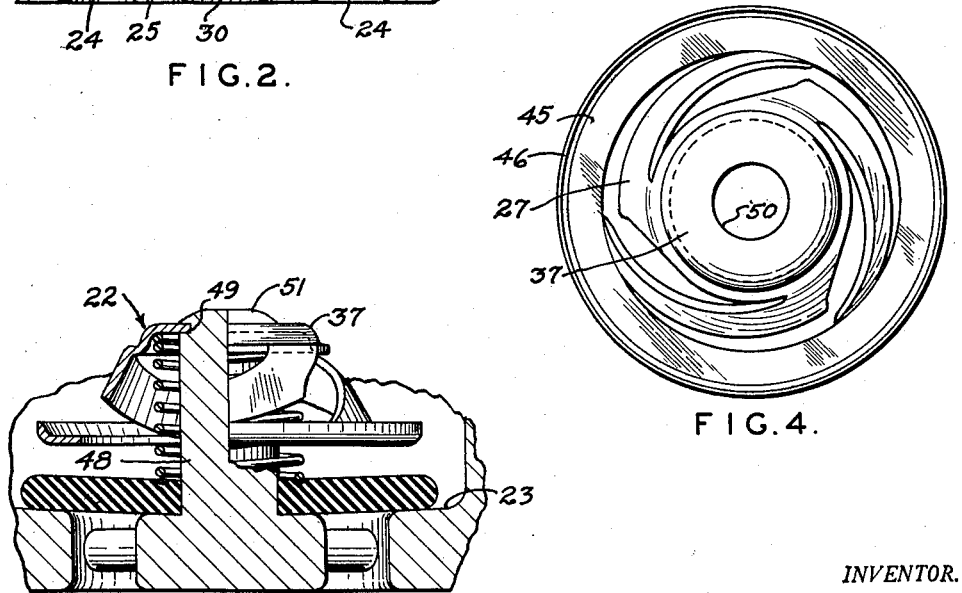
Fig. 3 is a view partly in section showing a modification of the pump valve.

Fig. 3 shows a modification of the check valve assembly 22 which comprises merely a change in the manner of mounting shown in Fig. 2. Fig. 4 is a top plan of the modified valve stop or caging member. In this type, the stem 28 is omitted and, instead, a stem 48 is cast integral with the valve seat bridging member 23 at the former location of the socket 25. The stem is provided with a reduced portion 49 received in the hole 50 in the rolled head 37. Portion 49 is headed at 51 to assemble the parts. Otherwise the valve assembly is identical with that above described in Figs. 1 and 2.

In each of the modifications above described the valve stop is constructed in a manner to facilitate rapid and satisfactory operation of the valve in the pump. When the valve 26 is open against the under side of the stop, the stream boundaries for the fluid passage through ports 24 will be defined by the outer edge of the seat 23 and the interior walls of casting 19 on the one hand, and the round edge of the valve 26 and upturned edge of rim 45 on the other, thus providing smooth unimpeded flow for the stream. As the valve starts to close at the end of the flow cycle, spring 29 will be aided by the fluid pressure above the valve acting on its upper surface. The fluid in the pump chamber is free to flow past the struts 27 because of their edge-on relation with respect to liquid or gas flow acting upon the valve upper surface.

We claim:

1. In a check valve structure, a wall having a concave valve seat and a port therethrough, a valve caging device including a tubular stem projecting from and snugly received in a socket in said wall, a ring-shaped resilient disk valve slidably mounted on said stem and having a planar surface engageable with said valve seat, an annular spring seat of channel section integral with said stem, a helical compression spring encircling said stem and reacting between said spring seat and said disk valve to urge and flex the latter into complementary seating engagement against said valve seat, a ring-shaped valve stop spaced from said valve seat to limit axial opening movement of said disk valve, and circumferentially spaced, spiral struts interconnecting said spring seat and valve stop and formed integrally therewith from a single piece of metal having two slots defining each strut.

2. In a check valve structure, a wall having a concave valve seat and a port therethrough, a valve caging device including a tubular stem projecting from and snugly received in a socket in said wall, said stem having a deformed end wall to resist removal of the stem from said socket, a ring-shaped resilient disk valve slidably mounted on said stem and having a planar surface engageable with said valve seat, an annular spring seat of channel section integral with said stem, a helical compression spring encircling said stem and reacting between said spring seat and said disk valve to urge and flex the latter into complementary seating engagement against said valve seat, a ring-shaped valve stop spaced from said valve seat to limit axial opening movement of said disk valve, and circumferentially spaced, spiral struts interconnecting said spring seat and valve stop and formed integrally therewith from a single piece of metal having two slots defining each strut.

3. In a check valve structure, a wall having a concave valve seat and a port therethrough, a valve caging device including a tubular stem projecting from and snugly received in a socket in said wall, said stem having a deformed end wall to resist removal of the stem from said socket, a ring-shaped resilient disk valve slidably mounted on said stem and having a planar surface engageable with said valve seat, an annular spring seat of channel section integral with said stem, a helical compression spring encircling said stem and reacting between said spring seat and said disk valve to urge and flex the latter into complementary seating engagement against said valve seat, a ring-shaped valve stop spaced from said valve seat to limit axial opening movement of said disk valve, and circumferentially spaced, spiral struts interconnecting said spring seat and valve stop and formed integrally therewith from a single piece of metal having two slots defining each strut, said slots being of progressively decreasing width toward their ends.

4. In a check valve structure, a wall having a concave valve seat and a port therethrough, a valve caging device including a tubular stem projecting from and snugly received in a socket in said wall, said stem having a deformed end wall to resist removal of the stem from said socket, a ring-shaped resilient disk valve slidably mounted on said stem and having a planar surface engageable with said valve seat, the end of said stem spaced from said valve seat having a portion extending outwardly to form an annular spring seat, a helical compression spring encircling said stem and reacting between said spring seat and said disk valve to urge and flex the latter into complementary seating engagement against said valve seat, a ring-shaped valve stop spaced from said valve seat to limit axial opening movement of said disk valve, and circumferentially spaced, spiral struts interconnecting said spring seat and valve stop and formed integrally therewith from a single piece of metal having two slots defining each strut, said slots being of progressively decreasing width toward their ends.

References Cited in the file of this patent

UNITED STATES PATENTS

| | | |
|---|---|---|
| 1,990,516 | Beckel | Feb. 12, 1935 |
| 2,090,486 | Richardson | Aug. 17, 1937 |
| 2,117,504 | Richardson | May 17, 1938 |
| 2,576,637 | Partriquin | Nov. 27, 1951 |